Figure 1B:
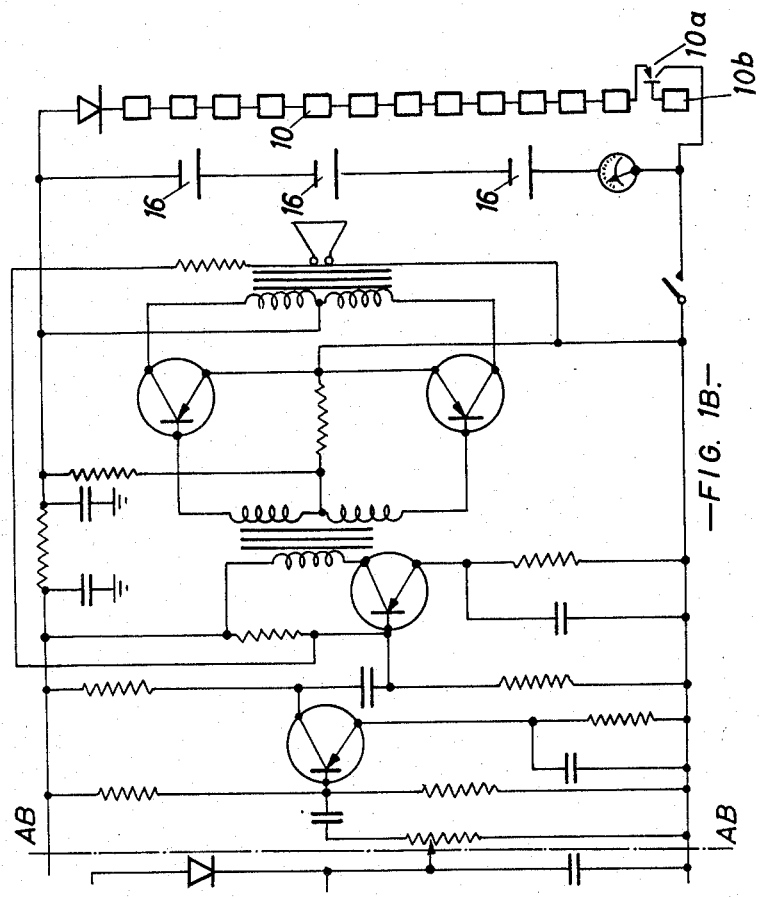

March 31, 1964  R. C. T. STEAD  3,127,552
PHOTO-CELL GENERATOR SYSTEM FOR CHARGING STORAGE DEVICES
Filed Nov. 28, 1961  3 Sheets-Sheet 1
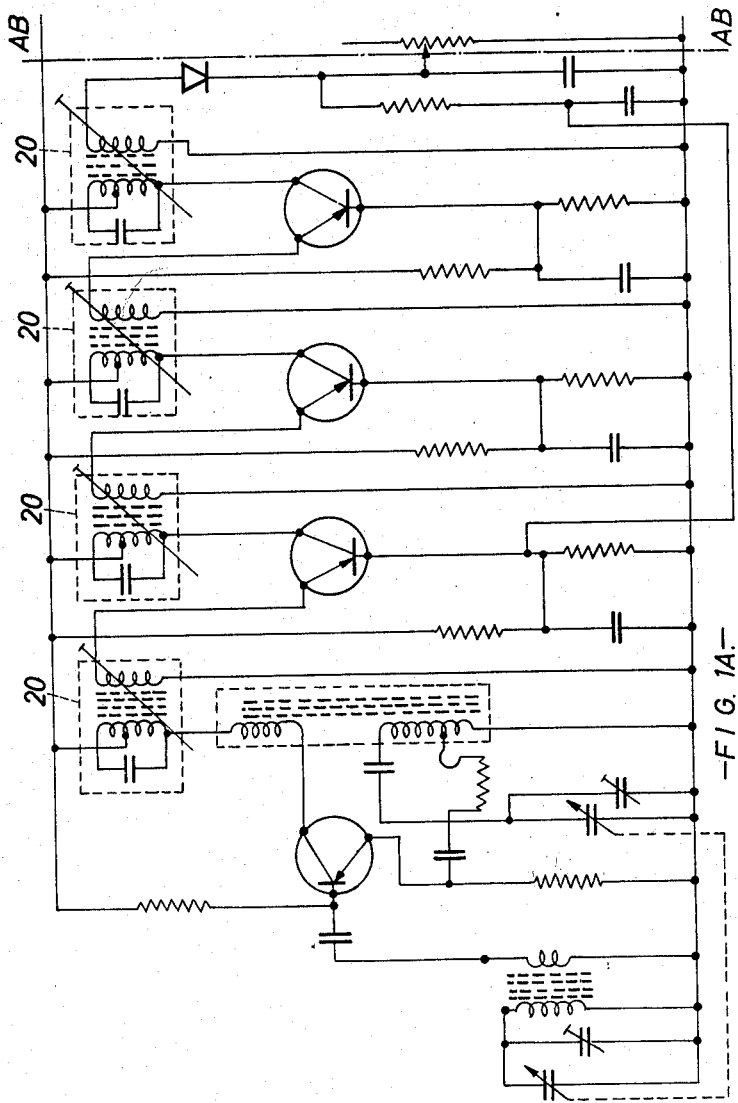
—FIG. 1A.—
INVENTOR:
Raymond Cecil Towler Stead
BY
Johnson and Kline
ATTORNEYS INVENTOR:
Raymond Cecil Towler Stead
BY
ATTORNEYS March 31, 1964  R. C. T. STEAD  3,127,552
PHOTO-CELL GENERATOR SYSTEM FOR CHARGING STORAGE DEVICES
Filed Nov. 28, 1961  3 Sheets—Sheet 3
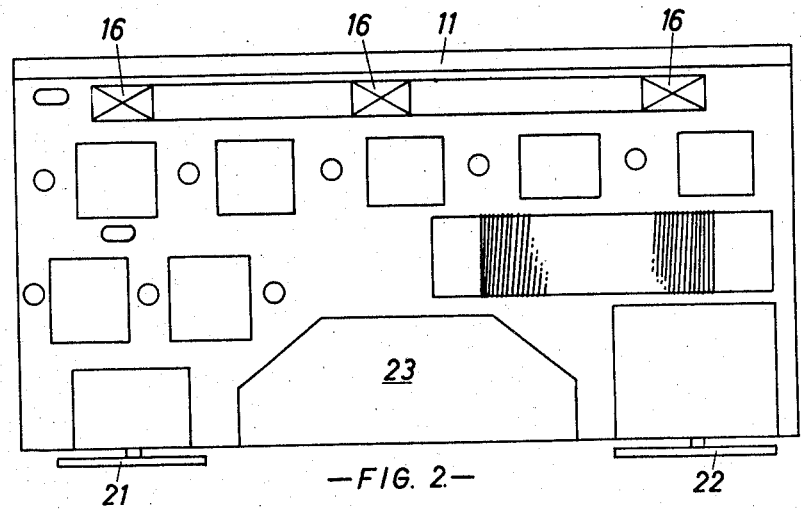
—FIG. 2.—
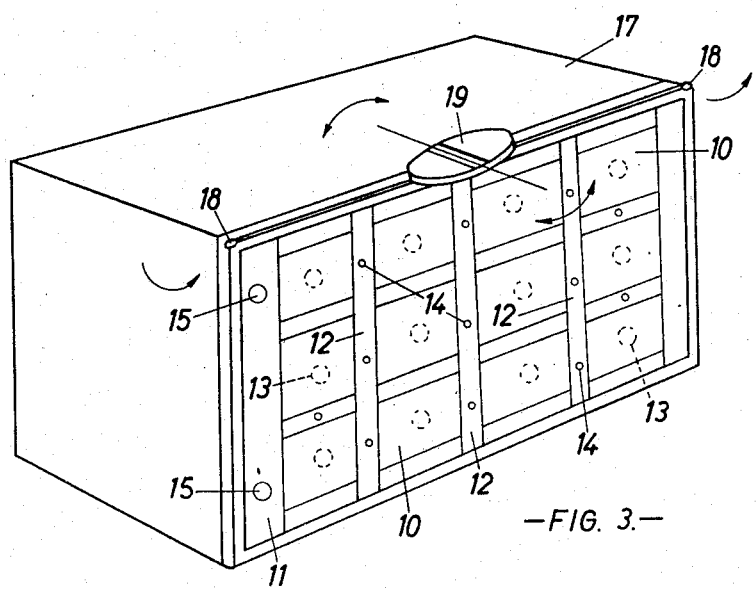
—FIG. 3.—
INVENTOR:
Raymond Cecil Towler Stead
BY
Johnson and Kline
ATTORNEYS

United States Patent Office 3,127,552
Patented Mar. 31, 1964

3,127,552
PHOTO-CELL GENERATOR SYSTEM FOR
CHARGING STORAGE DEVICES
Raymond Cecil Towler Stead, Belvedere House, 1 Moss
Hall Crescent, North Finchley, London N. 12, England
Filed Nov. 28, 1961, Ser. No. 155,338
3 Claims. (Cl. 320—2)

This invention is for improvements in or relating to electricity supply devices.

The invention is particularly, although not exclusively, applicable to electricity supply means for the operation of radio apparatus, especially radio receivers of the transistor type the electricity requirements of which are relatively small. The invention can however, be applied to the supply of electricity for the operation of other forms of apparatus such as, for example, electric clocks, electric shavers and the like.

An object of the present invention is to provide an electricity supply device which derives its energy from the sun or other light source and which is capable of supplying or meeting the electricity requirements of, for example, a radio receiver.

According to the present invention there is provided an electricity supply means comprising a light sensitive device or cell capable of generating electricity under the action of light, or a plurality of such cells or devices in series or in a series-parallel arrangement, connected to one or more accumulators or secondary cells to effect charging thereof and, in the circuit of said supply means, light-sensitive regulating means responsive to intensity of light and adapted to control the charging of the accumulator or accumulators and prevent damage thereto due to overcharging. One form of accumulator which has been found satisfactory is of the miniature nickel-cadmium type. A further particularly satisfactory accumulator is of the silver-zinc type cast in resin. It is contemplated that about three light sensitive devices or cells will be required for each such accumulator. Generally the accumulators will be connected in series or in a series parallel arrangement so as to provide the required voltage and current.

In one preferred arrangement several light sensitive devices or cells are mounted side by side on or against a panel, supporting member or base board, which may be of transparent material, and which, in the case of a piece of apparatus mounted in a casing, may form one wall of said casing. It may be of advantage to mount the base board or other supporting member for angular adjustment so that it can be set at an angle to obtain the maximum effects from the sun or other light sources. The device may be constructed so that this angle can be adjusted from time to time according to the position of the sun.

One particular embodiment of an electricity supply means according to the present invention embodied in a transistorised radio receiver will now be described by way of example.

In the following description reference is made to the accompanying drawings wherein:

FIGURES 1A and 1B together constitute a diagram of the radio receiver and its electricity supply means, FIGURE 2 is a plan view showing more particularly the lay-out of the components of the radio receiving apparatus and power supply, and FIGURE 3 is a perspective view of the radio receiver as seen more particularly from the rear.

In the embodiment of the invention shown in the drawings the electricity supply means comprises twelve, barrier layer, Type B photo-cells 10, connected in series to give an open circuit voltage of approximately 6.5 volts and a short circuit current of 5 milliamps., when subjected to normal sunlight. Each of these cells has a length of 50 mm. a width of 37 mm. and a thickness of 1 mm.

The twelve photo-cells 10 are mounted on a 1/16 inch thick panel or base of insulating material 11 measuring approximately 5¼ inches in length by 3 inches in width. The photo-cells are arranged on this panel in three horizontal rows of four cells each.

The photo-cells are insulated from each other by thin strips 12 of 1/16 inch thick glued to the panel 11 using a liquid glue in order to divide the panel into twelve sections.

Holes 13 (e.g. 5/16 inches diameter) are drilled through said sections and smaller holes 14 (e.g. 1/16 inches diameter) are drilled through the insulating strips and the portion of the panel against which they are secured, these holes being provided for the passage of connecting wires as hereinafter described. Sufficient space is left at one end of the panel 11 for mounting two output terminals 15 terminals 15 therein, which are connected to the electricity supply means above described and to the input to the radio receiver.

The twelve photo-cells 10 are lightly glued to the panel 11 using a liquid glue and are connected in series using five amp. fuse wire or other wire of very high conductivity. Connections to the front and rear of the photo-cells 10 are made through the holes 14 and 13 above referred to, the actual connections to the cells being made by means of a low temperature spray metal or solder now available from photo-cell manufacturers. The smaller holes 14 between the photo-cells are used for the front connections and the larger holes 13 behind each photo-cell are used for the rear connections. The two front connecting strips of each photo-cell are connected together to obtain maximum current output. The arrangement of the photo-cells is such that the front electrodes are negative and the rear electrodes are postive, and the negative and positive terminations are brought out to the two terminals 15, a one end of the panel 11. Connections to the rest of the apparatus are taken from these terminals as to relieve the photo-cell connections of any strain.

The electricity supply means also comprises three miniature or tiny DEAC nickel-cadmium accumulators 16 such as are marketed under the registered trademark Permaseal of 50 M.A.H.R. capacity at 10 hours rate. These accumulators are manufactured by Deutsche Edison-Achumulatoren Company, of Western Germany. The discharge voltage curve of such accumulators is more uniform than that of the usual primary or secondary cell. The three accumulators are connected in series, to give an open circuit voltage of about 4 volts, and are connected to the photo-cell assembly so as to be charged therefrom the output from the accumulators being taken to the apparatus to be supplied with electricity. The connections between the photo-cell generators and the accumulators must of course be of the correct polarity, positive to positive and negative to negative and of course the connections from the accumulators to the apparatus must also be of the correct polarity.

The photo-cells have been found to exhibit a rectifier function as well as a generator function and the reverse current through the photo-cells, when the generated voltage falls below the accumulator voltage, is negligible even when the photo-cells are darkened. A small fuse and isolating circuit breaker switch of suitable rating may be placed in the recharging circuit if desired.

The radio receiver itself is enclosed in a small casing or cabinet 17. The supporting panel 11 of the electricity generator above described s mounted at the rear of said casing and the output terminals of the bank of accumulators 16 are connected to the appropriate input connections of the receiver. The panel 11 is hinged at 18 so that it can be raised to the horizontal and then the vertical position. A swivel 19 then enables the panel to be set in the best possible position in relation to the light source.

The controls 21 and 22 and loud speaker 23 are fitted into the lid of the cabinet and the other components are mounted on internal plastic panels.

It will be appreciated that the above embodiment of the invention is only given by way of example. There may, for example, be more or less than twelve photo-cells and these may be larger or smaller than the dimensions given.

The charging circuit includes a current control device (e.g. a light sensitive or light operated resistor) because the photo-cells may be subjected to high illumination intensities. For instance, there may be included in the photo-cell generator and accumulator circuit a non-linear resistor or non-linear diode such as is made by the General Electric Co. Ltd. or such as is sold under the Registered Trade name "SENTERCEL" Zener by Standard Telephones and Cables Ltd. Such a device will provide self regulating or current controlling characteristics to compensate for changes in light intensity and/or temperature if such characteristics are required.

In the particular arrangement shown in FIGURE 1 a suitably rated transistor 10a is provided as a controlling device for the photo-cell generator. A photo-cell generator 10b is arranged to supply a bias voltage or current to said transistor 10a, this arrangement varies the conductivity of the transistor and thus effects some measure of control of the output of the photo-cell generator. The photo-cell generator 10b is, of course, positioned so that the amount of light it receives is the same as or is proportional to that received by the cells 10.

In a modification of the radio receiver above described at least one wall of the cabinet or casing 17 is made of transparent material and the panel carrying the photo-electric cells is located against this transparent wall. For example the cabinet may be made of a transparent material such as Perspex (registered trademark). Similarly the components of the apparatus may be mounted on internal plastic panels which are transparent the arrangement being such that as much light as possible is made available to the bank of photo-electric cells which in this case is enclosed within the cabinet. Furthermore instead of mounting the photo-cells on an opaque panel or base-board a transparent plastic mounting may be adopted. This may be moulded to shape so as to provide the separate sections for the several photo-cells.

The apparatus may be improved by using a printed circuit and by casting the apparatus (with the possible exception of the loud speaker) in a synthetic resin or like material.

Preferably the no signal current of the apparatus is kept as low as possible (e.g. in the region of 2 milliamps) by an appropriate choice of several of the resistors.

A photo-cell generator according to the invention may be used to operate a transistor radio transmitter for use, for example, in the radio control of model boats, aircraft and the like.

A milliammeter 33 (see FIGURE 1) may be provided to indicate the charging current and also the current necessary to operate the receiver.

I claim:

1. A photo-electric generator comprising an assembly of several photo-electric cells sufficient to produce a relatively high output at relatively low light intensity, an electricity storage means, means connecting said assembly of photo-electric cells to said storage means for the charging of the latter, and a light sensitive regulating means including a photo-cell generator, responsive to said light intensity, and a transistor having its emitter/collector circuit connected in series with said assembly of photo-electric cells and its base connected to said photo-cell generator whereby a bias current is applied to the base of the transistor, dependent on the light intensity, to reduce the conductivity of the transistor when the light intensity exceeds a predetermined amount and thereby control the charging of the electricity storage means and prevent damage thereto due to over-charging.

2. A photo-electric generator comprising an assembly of several photo-electric cells sufficient to produce a relatively high output at relatively low light intensity, a panel supporting said assembly of photo-electric cells in a plurality of rows, means mounting said panel for angular adjustment into a plurality of planes thereby to direct the photo-cell assembly towards a light source, an assembly of miniature electric storage cells, means connecting said assembly of photo-electric cells to said assembly of storage cells for the charging of the latter, and a light sensitive regulating means including a photo-cell generator, responsive to said light intensity, and a transistor having its emitter/collector circuit connected in series with said assembly of photo-electric cells and its base connected to said photo-cell generator whereby a bias current is applied to the base of the transistor, dependent on the light intensity, to reduce the conductivity of the transistor when the light intensity exceeds a predetermined amount and thereby control the charging of the electricity storage means and prevent damage thereto due to over charging.

3. A radio apparatus having an electricity supply means comprising a photo-electric generator which includes an assembly of several photo-electric cells sufficient to produce a relatively high output at relatively low light intensity, a panel constituting a wall of a casing of said radio apparatus and supporting said assembly of photo-electric cells, swivel means mounting said panel on said casing for angular adjustment into a plurality of planes thereby to direct the photo-cell assembly towards a light source, an assembly of miniature electric storage cells, means connecting said assembly of photo-electric cells to said assembly of storage cells for the charging of the latter, and a light sensitive regulating means including a photo-cell generator, responsive to said light intensity, and a transistor having its emitter/collector circuit connected in series with said assembly of photo-electric cells and its base connected to said photo-cell generator whereby a bias current is applied to the base of the transistor, dependent on the light intensity, to reduce the conductivity of the transistor when the light intensity exceeds a predetermined amount and thereby control the charging of the electricity storage means and prevent damage thereto due to overcharging.

References Cited in the file of this patent

UNITED STATES PATENTS

| | | |
|---|---|---|
| 2,402,662 | Ohl | June 25, 1946 |
| 2,780,765 | Chapin et al. | Feb. 5, 1957 |
| 2,919,353 | Paradise | Dec. 29, 1959 |
| 2,951,163 | Shaffer et al. | Aug. 30, 1960 |